Feb. 28, 1967 F. HANAU 3,306,184
APPARATUS FOR CONSTRICTING AND BINDING A CONTINUOUS
LENGTH OF MATERIAL AT SPACED POINTS THEREALONG
Filed Oct. 11, 1965 6 Sheets-Sheet 1
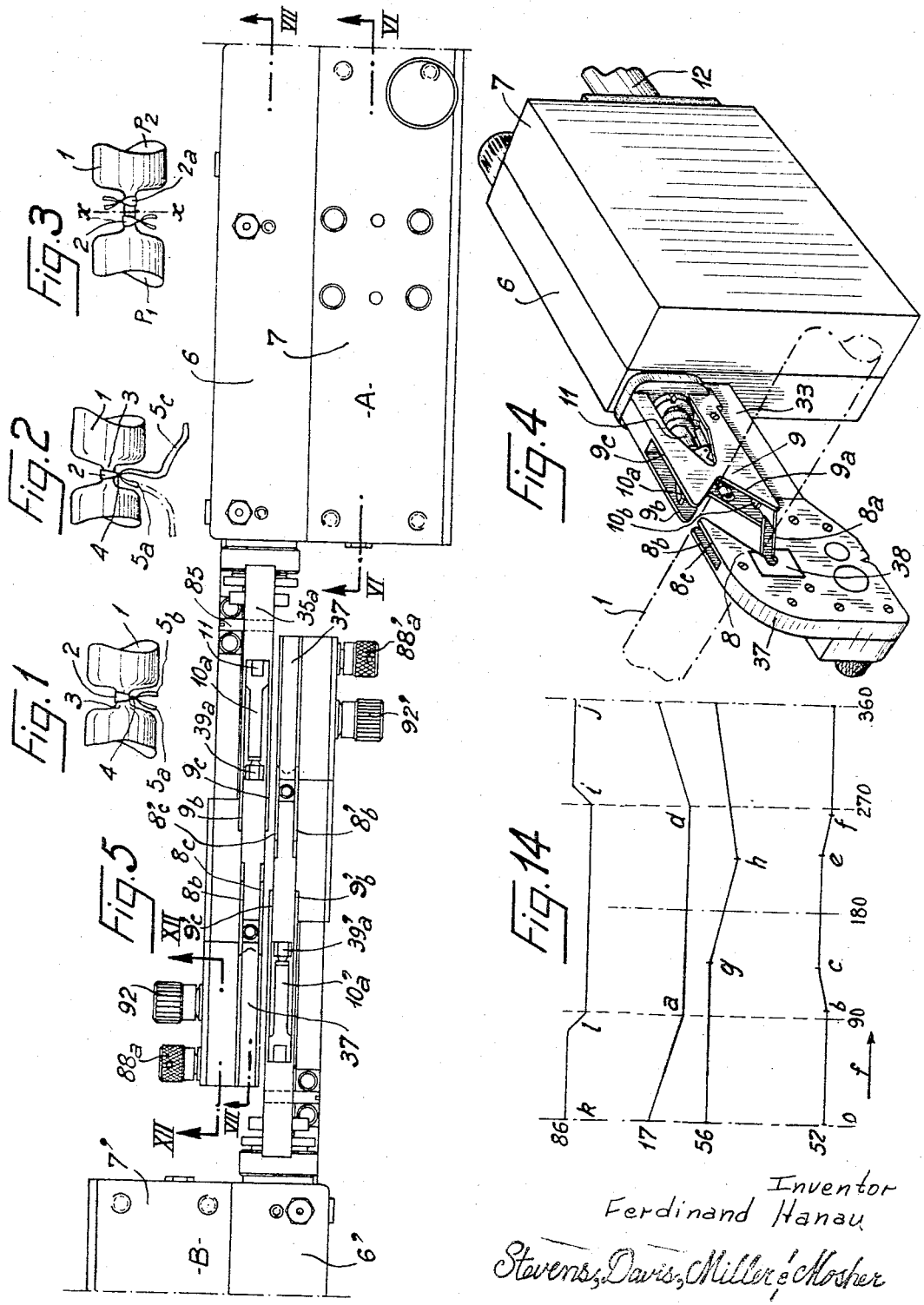
Inventor
Ferdinand Hanau
Stevens, Davis, Miller & Mosher
Attorneys

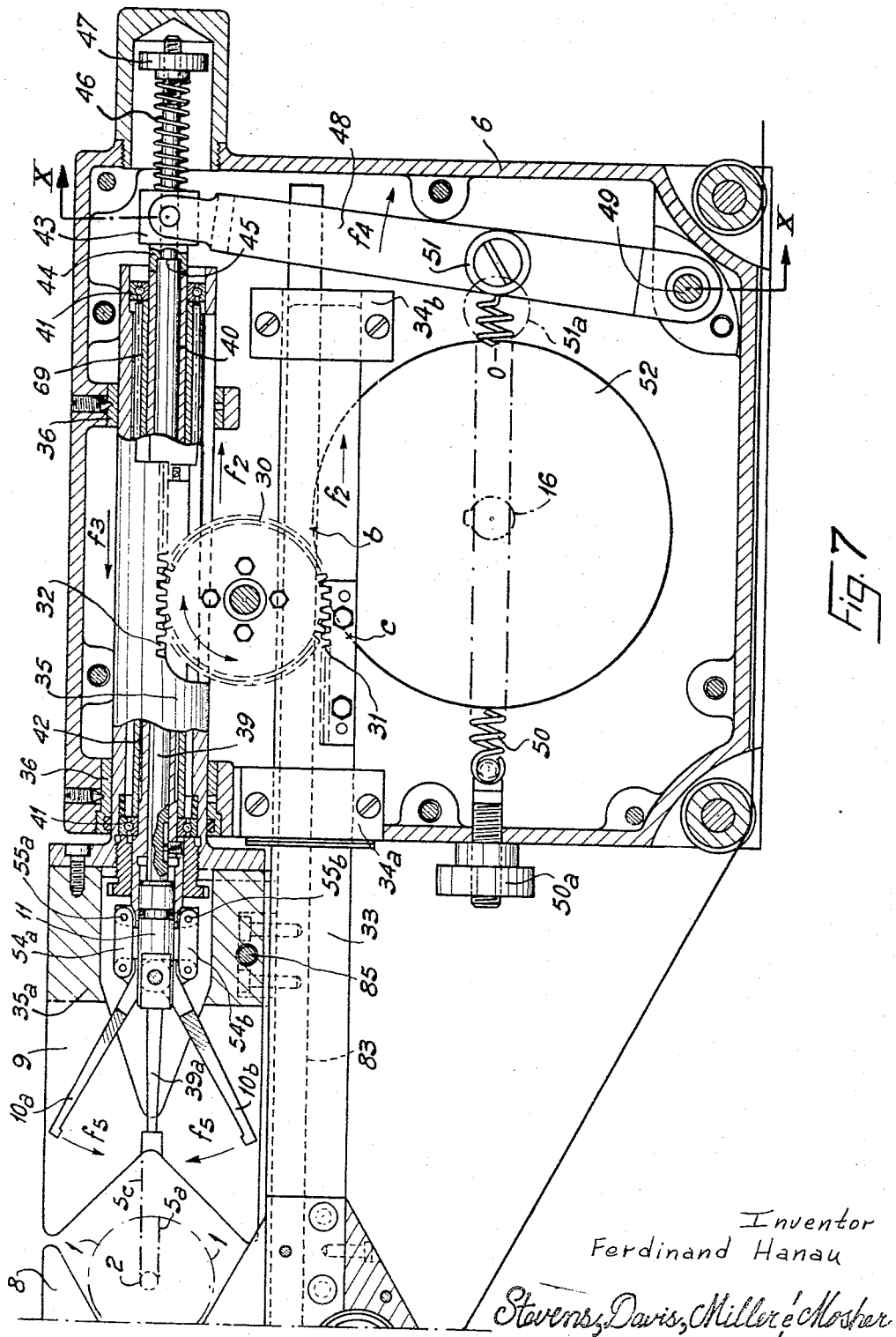

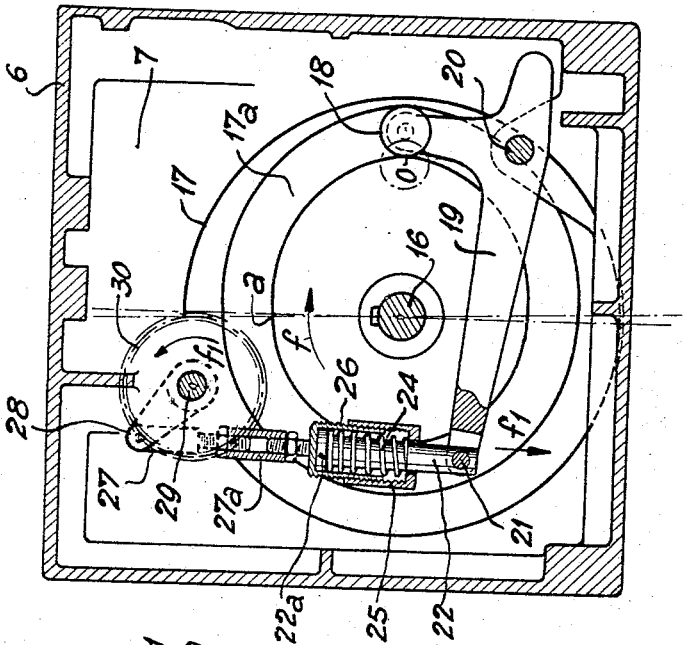

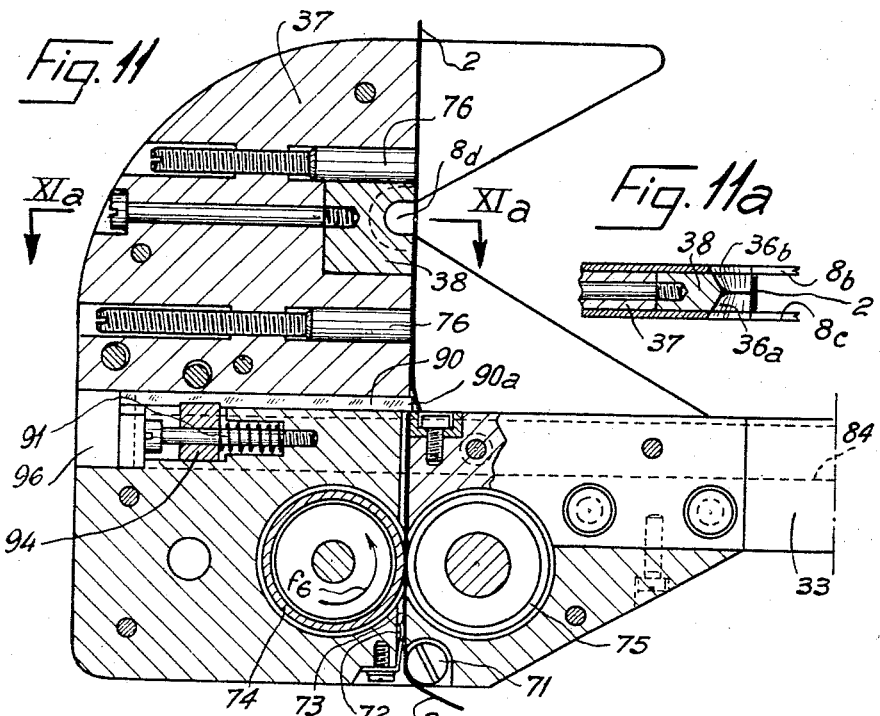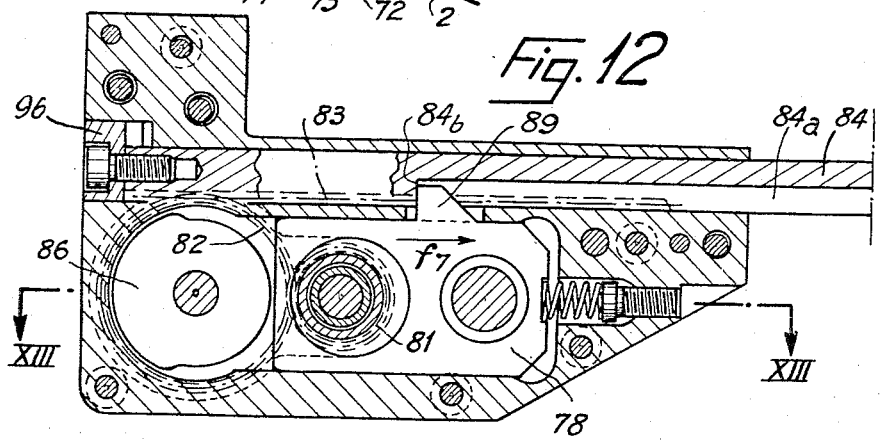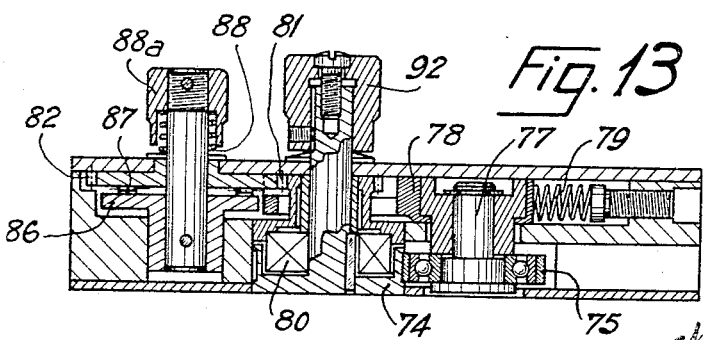

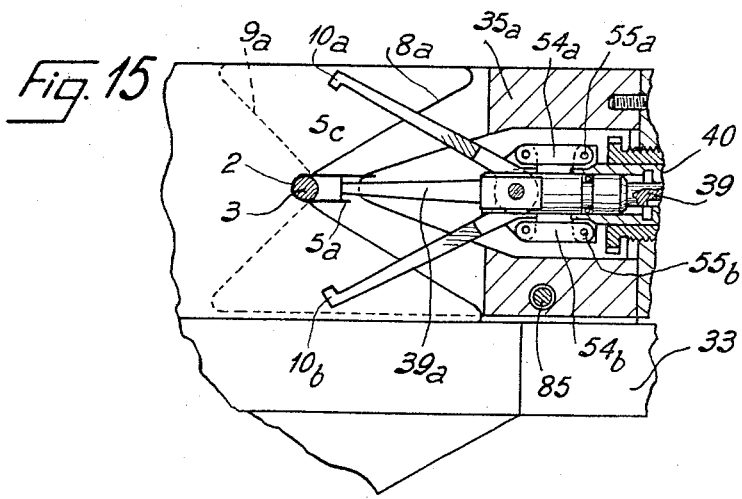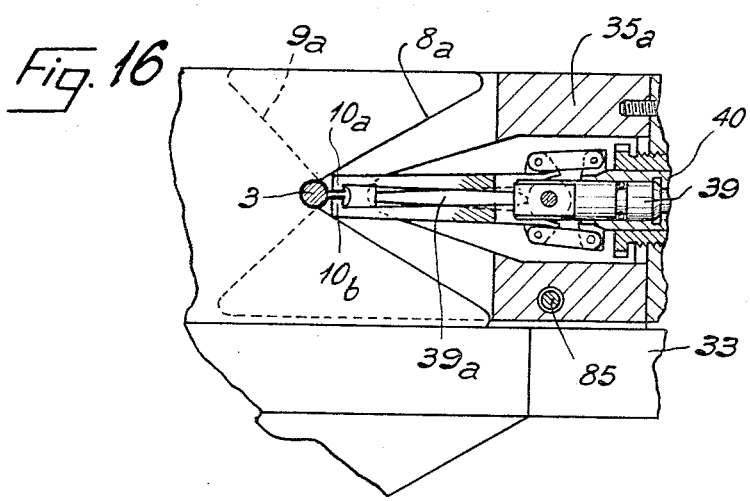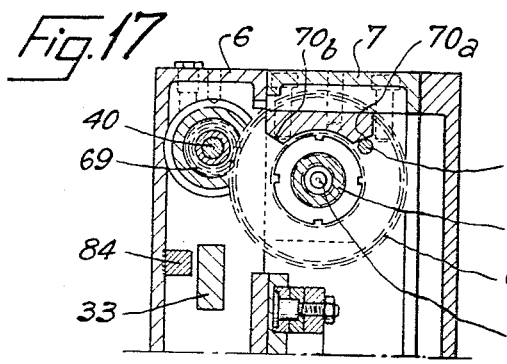

United States Patent Office 3,306,184
Patented Feb. 28, 1967

3,306,184
APPARATUS FOR CONSTRICTING AND BINDING A CONTINUOUS LENGTH OF MATERIAL AT SPACED POINTS THEREALONG
Ferdinand Hanau, 15 Blvd. Flandrin, Paris, France
Filed Oct. 11, 1965, Ser. No. 494,620
Claims priority, application France Oct. 14, 1964, 991,326
9 Claims. (Cl. 100—10)

This invention relates to apparatus which will form constrictions at spaced points along a continuous length of material of soft consistency, such as a continuous tube of sheet material filled with a food product, and will concurrently bind the constricted points of material with binding strip, string or wire. In the ensuing specification and claims, the term "strip" should be interpreted broadly as including a flexible elongated binder element of any of these types.

It is an object of this invention to provide a machine which will perform the specified process reliably and rapidly in an automatically controllable cycle. An object is to provide such a machine which will be relatively simple and economical to construct, operate and maintain, and highly compact.

An object of the invention is to provide apparatus including as the chief functional components therein:

A constrictor unit composed of two members relatively movable toward and away from each other and conformed to define a variable space therebetween through which the continuous length of processed material can be fed for constriction as the two members are moved toward each other.

Strip feeding means for intermittently feeding segments of binding strip into the space between the constrictor members for engagement with the material, including means for bending each segment of strip to hairpin shape about the constricted region; and Strip manipulator means comprising a pair of fingers operable to clasp the two sides of the hairpin-bent strip segment between them and then to be twirled so as to twist said two sides about each other to form the final binding.

Objects are also to provide an improved construction of a constrictor unit wherein the two members will be interpenetrable as they are moved towards each other in order to constrict the material between flared recesses formed in facing ends of the respective members until the material is ultimately confined in a restricted space defined between the inner ends of the recesses; to provide in association with such a constrictor unit an improved strip feeding device associated with one of the constrictor members for intermittently feeding a segment of strip past the inner end of the flared recess formed in said one member; and to provide in association with such a constrictor unit and feeding device, improved strip manipulating means positioned and operating within the other one of said constrictor members.

Important objects relate to the provision of improved mechanisms for operating the above enumerated means in a coordinated manner in an automatic cyclic sequence.

An exemplary embodiment of the invention will be described by way of illustration but not of limitation with reference to the accompanying drawings, wherein:

FIG. 1 is a perspective view illustrating the result produced by a machine according to the invention in providing a binding around a constricted part of a soft cylindrical object of indefinite length;

FIG. 2 is a similar view showing a somewhat modified form of binding;

FIG. 3 is a generally similar view illustrating two adjacent bindings as produced by two similar machines according to the invention disposed in cooperating relation (as shown in FIG. 5), as is useful when it is desired to separate the length of processed material into sections;

FIG. 4 is a small-scale perspective view of a machine unit according to the invention;

FIG. 5 is a plan view, on a somewhat larger scale, showing two machines each similar to the one shown in FIG. 4 and disposed in symmetrical opposed relation for cooperating in the production of a dual binding of the kind shown in FIG. 3;

FIG. 7 is an elevational view on a still further enlarged scale and in section on the line VII—VII of FIG. 5, the endmost part of the outer constrictor jaw assembly being omitted;

FIG. 8 is a cross sectional view on line VIII—VIII of FIG. 6;

FIG. 9 is a sectional view taken on the broken line IX—IX of FIG. 8;

FIG. 10 is a cross sectional view on the line X—X of FIG. 7 but drawn to a scale similar to the one used in FIGS. 6, 8 and 9;

FIG. 11 is a fragmentary view of the outer constrictor jaw member in vertical section, on a scale substantially larger than that of any of the preceding figures;

FIG. 11a is a detail view in section on line XIa—XIa of FIG. 11;

FIG. 12 is a sectional view on line XII—XII of FIG. 5, but on the same scale as FIG. 11;

FIG. 13 is a horizontal sectional view generally on line XIII—XIII of FIG. 12;

FIG. 14 is a chart showing the developed contours of certain cams used in the machine and significant points in the operating cycle;

FIGS. 15 and 16 are fragmentary views in vertical section showing the manipulator fingers respectively in open and in closed condition; and FIG. 17 is a section on line XVII—XVII of FIG. 6.

Figure 6:
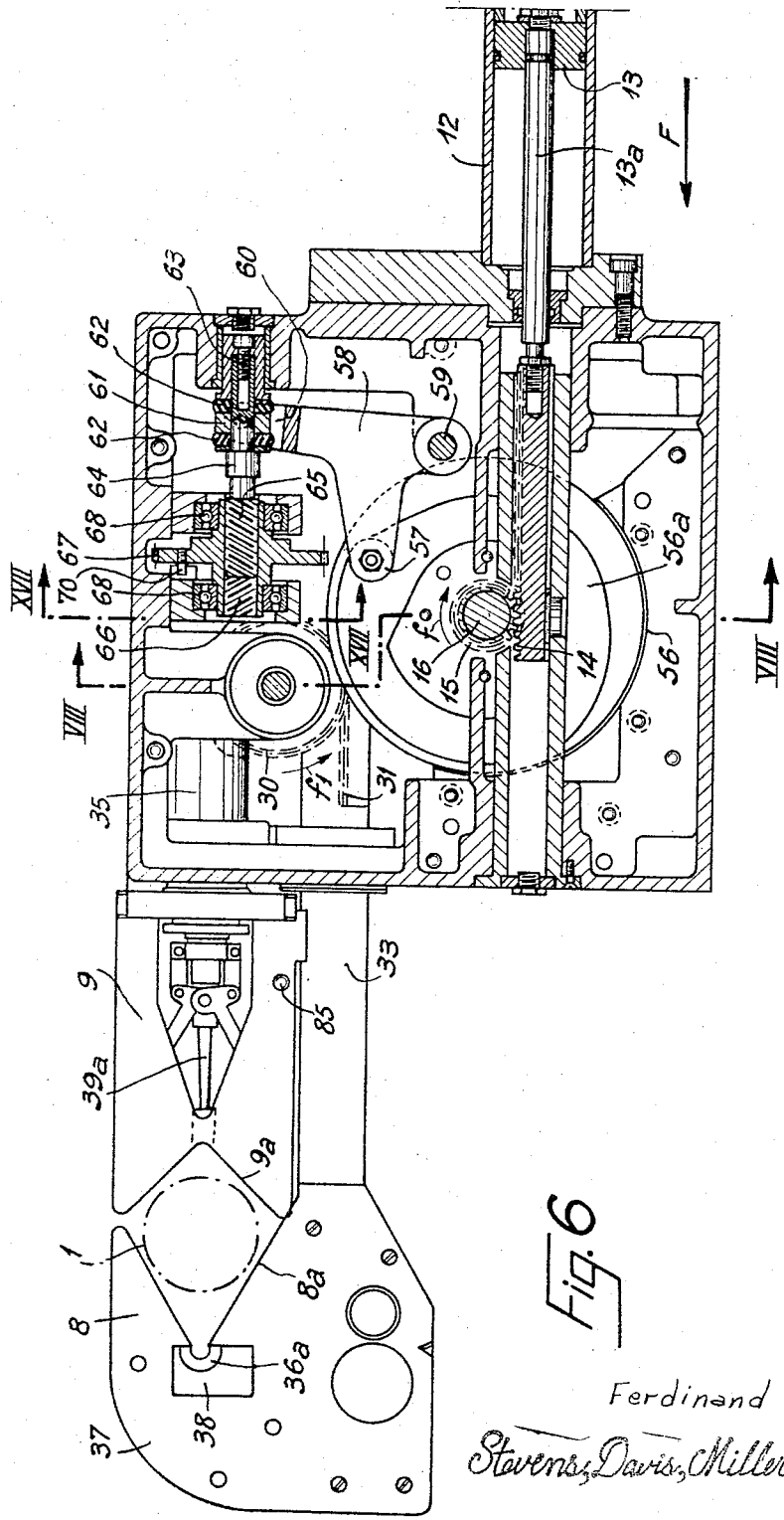
FIG. 6 is an elevational view of the machine shown in FIG. 4, on a somewhat larger scale and with parts shown in section on the line VI—VI of FIG. 5.

Referring to FIG. 1, the general purpose of a machine according to the invention is to accept a generally cylindrical or sausage-like article 1 of yielding consistency, form a constriction in the object as at 3 at predetermined spaced points along its length, and bind the constricted part by means of a flat strip 2. The binding strip 2 may conveniently be a strip of paper or suitable plastic sheet having one or more wires imbedded longitudinally therein for reinforcing it and imparting stiffness thereto. To perform the binding step, the continuous strip is fed from a suitable coil to the constricted region of the article 1, is cut to an appropriate length, and the cut length of strip is bent to a hairpin shape to form a bite or bend surrounding the constriction, the legs 5a, 5b of the bite being e.g. equal in length as shown in FIG. 1. The two legs of the strip segment are thereafter twisted together to produce the requisite binding. If desired, the legs of the strip surrounding the constriction may be made unequal as shown at 5a and 5c in FIG. 2. The longer leg 5c can then be used as a label having printed matter thereon, and/or may serve to provide a loop for handling purposes.

FIG. 3 illustrates a further manner of utilizing the invention. Using two machine units of the type to be disclosed, two strips 2 and 2a may be bound and twisted around longitudinally spaced, adjacent points of the article 1 in a common constricted area of it. Means may then be provided for cutting the article into sausage-like sections through a plane x—x between the two bound parts.

As best seen in FIGS. 4 and 6, a machine according to the invention comprises a box-shaped casing formed of two complementary sections 6 and 7, which casing houses the control mechanism for the functional units of the machine.

Projecting from the machine casing through an aperture formed in an end wall of casing section 6 is a movable jaw assembly including two oppositely movable jaw members generally designated 8 and 9 (best seen in FIGS. 4 and 6). The two jaw members are formed with V-shaped cutouts 8a and 9a respectively, facing each other. Jaw member 8 comprises a pair of spaced parallel flanges or plates 8b and 8c, and similarly jaw member 9 comprises the pair of parallel spaced flanges 9b and 9c. The transverse spacing between the flanges 8b and 8c is greater than the spacing between flanges 9b and 9c, so that the pair of flanges 8b, 8c is able to penetrate between the pair of flanges 9b, 9c, as the jaws 8 and 9 move towards each other during the simultaneous reverse reciprocation of both jaw assemblies later described. The inner end or apex of V-shaped recess 8a is formed with a part-circular notch 8d (also see FIG. 11) which coacts in the fully interpenetrated condition of the jaw members 8 and 9 with the part-circular inner end or apex of recess 9a to define a confined circular space. It will already be understood at this point that with the soft cylindrical object 1 clasped within the quadrangular space defined by the V-notches 8a and 9a, as shown in dot-dash lines in FIGS. 4 and 6, movement of the jaws 8 and 9 towards each other with interpenetration of the component flanges thereof, will force the material into said confined space and produce the desired constriction of said object.

The mechanism for imparting the reverse reciprocation to the jaw members 8 and 9 will now be described.

In the exemplary embodiment, the machine is powered by a fluid actuator comprising a cylinder 12 secured to and projecting from a rear end wall of the casing and having a piston 13 slidable in it. Cylinder 12 is connected to any suitable source of pressure fluid in a conventional fluid circuit, not shown, including the usual valving operated e.g. electromagnetically to accomplish the desired automatic operating cycle, in synchronism with means, not shown, for feeding the material 1.

A piston rod 13a extends from piston 13 and is connected at its inner end with a rack member 14 guided for reciprocation in suitable sliding bearings within the casing section 6. Meshing with the rackbar 14 is a pinion 15 secured on a main shaft 16 journalled in suitable bearings across the casing sections 6 and 7 as clearly shown in FIG. 8. Secured on an end extension of shaft 16 is a disc-shaped cam 17 having a camming groove 17a formed in one side.

Received within the camming groove 17a is a follower roller 18 which is pivotally supported from one arm of a lever 19. The lever 19 is pivoted on a pivot 20 supported for rotation about a horizontal axis parallel to that of shaft 16 on an internal fixed support forming part of casing section 7 (see FIG. 9). Lever 19 includes a longer arm having pivotally connected to its free end at 21 a generally vertical link assembly which is of variable length. As clearly shown in FIG. 9, said link assembly includes a lower rod portion 22 having its lower end pivoted at 21 to lever 19 and having an enlarged head 22a at its upper end, seated against the upper endwall of an upper cup-shaped member 26. A lower cup-shaped member 25 is secured by a threaded connection to member 26 and rod 22 passes freely through a hole in the bottom end wall of lower member 25. A coil spring 24 surrounding rod 22 within the cylindrical housing formed by the opposed cups 25 and 26 applies head 22a upwards against the top wall of said housing. The lower cup member 26 is secured to the lower end of a two-part rod 27 forming an extension of the lower rod 22. The two-part rod 27 as shown in FIG. 9 includes two opposite-threaded portions which are interconnected by a correspondingly threaded coupling member 27a enabling adjustment of the total effective length of the link. The upper end of two-part rod 27 is pivotally connected to a lever arm 28 secured on a shaft 29 journalled across the casing sections 6 and 7 as shown in FIG. 8. The shaft 29 has secured to it, within section 6, a gear 30 (also see FIG. 7). Meshing simultaneously with diametrically opposed areas of gear 30 are two horizontal rackbars, a lower rackbar 31 and an upper rackbar 32, which are respectively secured to the jaw members 8 and 9.

As here shown, lower rackbar 31 is fixedly secured, as with screws, to a side of a bar 33 which is supported in sliding bearings 34a and 34b secured to casing section 6, the bar 33 having the outer jaw member 8 attached to its outer end. The upper rack bar 32 is cut out of a side of a round tubular bar 35 which is axially slidable in bearings 36 of casing section 6 and has the inner jaw member 9 attached to its outer end.

The mechanism so far described operates as follows. Considering the initial position shown in FIG. 6 piston 13 is at the outer end of its stroke in cylinder 12 and roller 18 is engaging a maximum-radius point of camming groove 17a (FIG. 9). In this position the jaws 8 and 9 are open to a maximum degree so that no pressure is exerted on the cylindrical object 1 positioned between them. When actuator 12 is operated to displace piston 13 leftward as indicated by arrow F (FIG. 6), piston rod 13a acting through rack 14 and pinion 15 rotates shaft 16 clockwise (arrow f, FIG. 6). Cam 17 is rotated with shaft 16 (see FIG. 9), so that camway 17a forces follower roller 18 radially inward toward shaft 16, whereby lever 19 is rotated at a relatively slow rate about pivot 20 to lower the vertical link 22 as indicated by arrow f1. Lever arm 28 is correspondingly rotated counterclockwise, as shown by arrows f'1 in FIGS. 9 and 6, and the gear 30 acting on racks 31 and 32 moves the upper bar 35 and lower bar 33 in opposite directions as shown by arrows f3 and f2 in FIG. 7. The jaws 8 and 9 are thus moved toward each other to clamp the soft cylindrical object 1 between the walls of the V-cutouts.

The diameter of pinion 15 is so determined that the cam 17 performs one revolution when piston 13 moves from one end of the cylinder to the other end. The developed contour of camway 17a is shown as the line "17" in FIG. 14, where the horizontal coordinate indicates angles of cam rotation, with the 0° angle being taken as the position assumed by the cam with piston 13 at the outer end of its stroke as shown in FIG. 6. It will be noticed that the camway contour is symmetrical to opposite sides of the 180° position, so that the movements of all the parts will be the same during the outward stroke of piston 13 as during its inward stroke. The flat section a–d of the developed contour represents an arc of constant radius of the camway circumference throughout which the lever 19 remains motionless and the jaws 8 and 9 consequently are held stationary in their fully clamped position. The minimum spacing between the jaws 8 and 9 in this position, and the consequent size of the resulting constriction 3 in the object 1, can be adjusted by rotating the threaded coupler 27a to adjust the effective length of the link 22, and the clamping pressure applied to the material 1 can be modified by rotating the lower cup-like spring seating member 25 to modify the biassing tension of spring 24.

Additionally to control the size and shape of the constriction 3 in dependency on the size and nature of the handled product, the flanges 8a–8b and 9a–9b of the jaws are made readily removable and interchangeable in the disclosed embodiment, being attached to their supporting bars 33 and 35 by way of screws as here shown. Advantageously, the V-cutout 8a has an included angle of about 60° and cutout 9a an included angle of about 90°.

As shown in FIGS. 11 and 11a, there is provided between the flanges 8b and 8c of jaw 8, for reasons that will appear later, a concave backing member 38 having a biconical profile which defines a semi-circular edge or arris paralleling the semi-circular notch 8d formed at the apex of the V-cutout 8a, The profile backing member 38 is made of suitable wear-resistant material and is removably secured by means of a long-shanked screw, as shown, to a spacer member 37 inserted between the flanges 8b and 8c, The purpose of this construction will appear later.

Means will now be described for manipulating the strip 2 in forming a bite or bend around the constriction 3 and twisting together the legs of the bend to bind the constriction. The strip manipulating means are generally positioned between the flanges 9b, 9c of the inner jaw member 9 and include a pair of slender fingers 10a, 10b interpivoted on a common transverse axis on a cylindrical supporting head 11. Means, presently to be described, are provided for moving the fingers 10a, 10b between an open or spread-apart position (FIG. 15) and a closed position (FIG. 16) in which the tips of the fingers clamp between them the legs 5a, 5c of the length of strip 2 forming a bend around the constriction 3. Further means are provided for rotating the supporting head 11 and the fingers when these latter are in the closed position, in order to twist the two legs of the strip together.

The supporting head 11 carrying the manipulating fingers 10a, 10b is coaxially secured on the outer end of a rod 39 which extends axially through the tubular bar 35. Rod 39 is rotatable relative to the tubular bar 35 and is axially displaceable a limited amount relatively to it.

Slidably surrounding and supporting the axial rod 39 is a cylindrical sleeve 40, which in turn is supported for rotation within the tubular bar 35 by way of end bearings 41, while being axially movable bodily with it. The bearings 41 are shown blocked in position within end enlargements of tubular bar 35 by means of a spacer tube 42. The sleeve 40 at its forward or outer end has a pair of links 54a, 54b pivoted at 55a, 55b to diametrically opposed lugs of the sleeve, and the forward ends of these links are pivoted to lugs projecting from the respective fingers 10a, 10b near the common pivot of these fingers. It thus will be seen that limited axial displacements of rod 39 relative to sleeve 40 (and to tubular bar 35 with which the sleeve is, axially, bodily movable), will act through the links 54a, 54b to rotate the fingers between their open and closed positions.

Axial displacements of rod 39 relative to sleeve 40 and bar 35 are produced by the following mechanism. A bush 43 is slidable on an inner end extension at the right side of rod 39, and a coil spring 46 surrounding the rod extension is seated between a surface of bush 43 and a spring-tension adjusting nut 47 mounted on a threaded end part of the rod extension. The spring 46 thus urges the bush 43 by way of an interposed spacer bush 44 against an annular shoulder 45 of the rod 39. The bush 43 is pivoted to the upper end of a lever 48 the lower end of which is pivoted at 49 to a suitable part of casing section 6. A follower roller 51 pivoted to an intermediate point of lever 48 is able to engage a peripheral cam 52 secured on the shaft 16. A tension spring 50 has one end connected to lever 48 and its other end connected to an anchoring member supported from a wall of casing section 6 by way of an adjustable mounting nut 50a whereby the tension bias of the spring 50 can be adjusted. Spring 50 tends to rotate lever 48 counterclockwise to press bush 43 against bush 44 and rod 39. However, in the initial position of the parts shown in FIGS. 6 and 7 follower roller 51 is clear of the periphery of cam 52 because rod 39, together with sleeve 40 and jaw-supporting bar 35 are in a right end-most position in which the shoulder 45 of rod 39 acting through spacer bush 44 holds lever 48 in a rightward rocked position against the tension of spring 50, with roller 51 disengaging the periphery of cam 52. Somewhat before the instant in the operating cycle when the closing movement of jaws 8 and 9 is terminated, i.e. somewhat before the instant indicated at a in the developed contour of cam 17 (FIG. 14), the bodily leftward movement of bar 35 and sleeve 40 and rod 39 permits lever 48 to be rotated by tension spring 50 to a position wherein follower roller 51 engages the periphery of cam 52 as indicated in phantom at 51a. The cam 52 has a developed peripheral contour as indicated by line "52" in FIG. 14. As shown, said cam has a major arc of smaller radius between points f and b and a minor arc of larger radius from point c to point e. It will therefore be apparent that as both cams 17 and 52 are simultaneously rotated by shaft 16, the jaw assembly 9 is moved leftward (and jaw assembly 8 rightward), to compress the material 1, and somewhat before full compression is achieved to produce the constriction 3 (at point a of cam 17) roller 51 engages the smaller-radius part of peripheral cam 52. Then shortly after full compression is attained (point a) the larger-radius part of cam 52 acts on roller 51 (starting at point b of cam 52) to displace the rod 39 rightward relative to jaw 9 and sleeve 40, thereby closing the manipulator fingers 10a, 10b. It will also be noted from the chart of FIG. 14 that the jaws 8 and 9 remain stationary to apply maximum compression to the material 1 throughout and appreciable part of the cycle from point a to point d, and that the fingers 10a, 10b remain stationary in their closed condition through a part of the cycle from point c to point e, included within the phase of full compression a–d.

The binding strip 2 is fed vertically upward of jaw assembly 8 across the semi-circular apical notch 8d therein as best seen from FIG. 11, and is cut at a suitable point of the cycle by a cutter 90 below said notch. The strip feeding and cutting mechanism will be later described in greater detail. First, means will be described for forming the bend in the cut strip 2 around the constricted material. It is understood that after this bend is formed, the two legs of the strip such as 5a and 5c (FIG. 15) are clasped by the closing of the manipulator fingers 10a, 10b engaging the outer surfaces of the strip. Then the rod 39 (together with sleeve 40) is rotated to twist the legs of the strip together. This rotation of the rod 39 and manipulator fingers, presently to be described in detail, occurs during the closed condition of the fingers i.e. during phase c–e of the cycle.

The bend-forming means comprises a pusher finger 39a projecting axially from the front end of supporting head 11, and cooperating with the afore-mentioned biconical backing surface 36a–36b. The pusher finger 39a is so dimensioned that it first engages the surface of the material 1 during the leftward movement of jaw 9 before the final constriction 3 has been formed in the material. As the leftward displacement of jaw 9 continues, pusher 39a acts to press the material 1 against the backing surface, causing the cut length of strip 2 to assume a corresponding hairpin bend around the constricted region 3 of the material. The legs such as 5a, 5c of the hairpin-bent strip are then in a position to be clasped between the manipulator fingers 10a, 10b on subsequent closure thereof as earlier explained. The degree of pressure exerted by pusher 39a on the material can be controlled by adjusting the bias of tension spring 50 by means of the nut 50a. The clamping pressure applied by the fingers 10a, 10b on the strip 2 is controlled by adjusting the bias pressure of spring 46 by means of nut 47.

The mechanism for rotating the manipulator fingers 10a, 10b while in closed condition for twisting the binding strip will now be described. This mechanism includes a pinion 69 secured around the periphery of sleeve 40 (see FIG. 17), and meshing with a gear 67 projecting into engagement with the pinion through a lateral opening formed in tubular bar 35 and spacer tube 42. The gear 67, as shown in FIG. 6 and 17, is mounted for rotation in bearings 68 supported in suitable structure near the top of casing section 6. The gear 66 is internally formed with a screw thread 66 which is engaged by the complementary threading 65 of a worm shaft 64. This shaft is supported for non-rotatable limited axial displacement relative to the casing in slide bearing means as shown in FIG. 6. Axial reciprocation is imparted to worm shaft 64 from a cam 56 secured on the common camshaft 16. Cam 56 is for this purpose formed with a lateral camway 56a in which is received a follower roller 57 pivoted to an arm of a lever 58 pivoted at its lower end at 59 to the casing. The upper end of lever 58 is formed as a shifting fork 60 engaging a collar 61 mounted around the worm-shaft 64 for limited axial displacement between a pair of spaced resilient washers 62 made of rubber or the like, the collar 61 and washers 62 being clamped in the axial direction between an annular enlargement of shaft 64 (on the left side of the assembly) and the end face of a cup-shaped blocker member secured over the right end of shaft 64 by means of a screw 63 (see FIG. 6).

The contour of camway 56a is shown in developed profile as line "56" in FIG. 14, and it will be seen that said contour includes a section g–h of varying radius, so positioned to correspond with the points c and e respectively of the cam 52 that said varying radius part engages roller 57 during the period of closure of the manipulator fingers 10a, 10b, as determined by the larger-radius arc c–e of cam 52. It will be apparent that with the arrangement described, the cam 56 acts, by way of lever 58, wormshaft 64, gear 67 and pinion 69, to impart a twirling motion to the fingers 10a, 10b while the fingers are in closed position (as in FIG. 16), thereby twisting the two legs of the strip 2 together to bind the constriction 3 in the material.

Means are provided for causing the twirling of the fingers to be arrested in a position where the fingers are in a vertical plane so that the fingers can subsequently be opened out again without interference from the flanges 9b, 9c. For this purpose a pin 70 projecting axially from a side of gear 67 is adapted to engage with one or the other radial end surfaces 70a, 70b of a sector-shaped stop member secured to casing section 7. The dimensioning, including the ratio of gearing 67–69, is so determined that in either end position of gear 67 the fingers 10a, 10b are positioned in a substantially vertical plane. The resilient washers 62 mentioned above serve to prevent application of excessive stresses to gear 67 and associated parts when its rotation is arrested.

The mechanism for feeding and cutting the binding strip 2 will now be described, with particular reference to FIGS. 11–13. The strip 2 is fed from a suitable store such as a coil not shown, upward from below the jaw assembly 8, around a bottom guide roller 71, a leaf spring 72 being provided for lightly pressing the strip against this roller. The strip then passes upward through a guiding channel 73 and between a pair of rollers 74 and 75, roller 74 being a drive roller and roller 75 a backing roller. Backing roller 75, as shown in FIG. 13, is freely rotatable on a ball bearing around a pin 77 secured in a slider 78 slidable in a suitable guide structure towards and away from drive roller 74 and pressed thereagainst by a compression spring 79. The drive means for feed roller 74 are later described.

Above the feeder and backing rollers 74 and 75, the strip 2 is passed upward through a guide channel, past a cutter member 90 later described and up across the face of the spacer block 37 earlier referred to, which includes the semi-circular notch 8d. As mentioned earlier, the strip 2 advantageously includes one or more thin-gauge wires for reinforcing it, and such wires are desirably made from magnetic steel, whereby they serve the additional purpose of holding the strip in position against the vertical face of block 37 by magnetic attraction. There is shown for this purpose a pair of permanent magnet pole members 76 inserted in bores formed in block 37 and retained therein with screw rods.

Returning to feed roller 74, it is seen from FIG. 13 that this roller is coupled by way of a one-way clutch or free-wheel device generally indicated at 80 to a gear 81 secured around a pin journalled across the flanges 8b, 8c, said pin having a knob 92 secured to an outer end of it to permit manual rotation of roller 75 when desired to feed the strip manually as for initial adjustments. Pinion 81 meshes with a gear 82 journalled in flange 8b. Gear 82 meshes with a rack member 83 (see FIG. 12) formed on a side surface of a horizontal bar 84 generally coextensive with the lower reciprocating bar 33, but secured for movement with the upper reciprocating bar 35 by means of one or more screw studs such as 85 engaging a spacer block 35a secured between the jaw flanges 9b, 9c.

With this arrangement, it will be seen that the displacement of jaw-supporting bar 35 in either direction during its reciprocation, rotates gear 82 and pinion 81 in a corresponding direction. The one-way coupling 80, however, is so arranged that feed roller 74 is only rotated during the receding movement of bar 35 so as to revolve intermittently in the direction indicated by arrow f6 in FIG. 11, thereby imparting stepwise upward feed movement to strip 2. Means are provided whereby the rotation of feed roller 74 is only effective to impart feed movement to strip 2 during a predetermined and adjustable period of the operating cycle. As shown in FIGS. 12 and 13, a cam 86 is rotatable coaxially with gear 82 and is connectable for rotation therewith by means of a set of fine dog clutch teeth 87 provided on facing side surfaces of the gear and cam. A spring 88 seated against the inner surface of a knob 88a is secured on the outer end of the pin carrying the gear 82 and cam 86 normally urges the dog-clutch teeth into engagement. The cam 86 has a periphery including a smaller and a larger-radius portions, as indicated by the developed contour on the line "86" in the chart of FIG. 14. The larger-radius arc of the cam is adapted to engage a cooperating surface of the afore-mentioned slider 78 to push backing roller 74 away from drive roller 75. In order to adjust the point in the operating cycle when this action occurs for initiating and arresting the feed of the strip, it is simply necessary to depress knob 88a thereby disengaging the clutch teeth 87, and then rotate it in order to adjust the relative orientation of the cam 86 with respect to gear 82. Further, in order to provide a positive limitation to the upward feed of strip 2 on termination of the receding movement of tubular bar 35, there is provided a stop nose 89 projecting upward from slider 78 and having a surface engageable with the end surface 84b of a longitudinal groove 84a formed in the rack-carrier bar 84. Engagement of part 84b with part 89 at the end of the rearward stroke of tubular bar 35 (i.e. in the direction of arrow f2 in FIG. 7), acts to push the slider 78 in the direction shown by arrow f7 a small but appreciable amount to disengage backing roller 74 positively from drive roller 75.

The strip severing mechanism will now be described. The cutter member 90 is slidably received in a slot formed in the spacer block 37 interposed between the flanges of outer jaw 8. A compression spring 91 inserted in a socket of block 37 and acting between the endwall of the socket and a part 94 attached to the lower side of the cutter 90 as clearly shown in FIG. 11, urges the cutter 90 in an outward direction to a retracted position wherein its cutting edge 90a is positioned clear of the vertical path of strip 2. In this retracted position of cutter 90, shown in FIG. 11, its outer end is seated against a stop 96 projecting laterally from the outer end of afore-mentioned rack bar 84. During the portion of the cycle when jaws 8 and 9 move away from each other, stop 96 is carried rightward by rackbar 84 moving bodily with jaw 9. Thus, as the bar 35 recedes in the direction of arrow f2 (FIG. 7), movement is imparted to cutter 90 rightward (in FIG. 11) whereby its cutting edge 90a cuts through the strip 2.

As shown in FIG. 5, two machines A and B each constructed in accordance with the invention can conveniently be disposed in cooperating relation, with their jaw assemblies overlapping as shown. Parts of the B-unit are designated with primed reference numerals. The material to be handled is passed through the spaces defined between the pairs of jaws 8–9 and 8'–9' of the two units, which are so aligned that the constrictions 3 produced in the material 1 by the two machines are in alignment with a transverse axis defining the path of feed of said material. The camshafts 16 and 16' (not shown) of the respective machines may be so set with respect to each other that with the actuator cylinders of the respective units operated in synchronism the operating cycles of the two machine units are also performed substantially in synchronism. Thus two adjacent bindings will be produced as indicated at 2 and 2a in FIG. 3. Additional cutter means, not shown, may be provided for operation by either one of the machines (or by separate means) to cut through the constriction at the position x—x between the two bindings.

Various modifications may be introduced into the details of the mechanisms shown and described without departing from the scope of the invention.

What I claim is:

1. Apparatus for binding a continuous length of yielding material at determined intervals along said length, comprising:
   constrictor means including a pair of relatively displaceable members defining a variable space therebetween through which the material is passed;
   means for relatively displacing the constrictor members toward each other for constricting the material and away from each other to permit the passing of the material therebetween;
   means feeding segments of binding strip into said space for engagement with the material so as to form a bend of the strip around the constricted material portion;
   strip-manipulator means including a pair of fingers and means mounting said fingers for opening and closing movement and for rotation;
   means imparting closing movement to the fingers so as to clamp a bend of strip therebetween and for subsequently opening said fingers to release the strip;
   means imparting rotation to the fingers while in closed condition to twist the strip clamped therebetween; and
   means connected for operating said constrictor displacing means, strip feeding means, and finger opening and closing and rotating means in a cyclic sequence.

2. Apparatus as defined in claim 1, wherein said constrictor means comprises:
   a first member consisting of a pair of generally flat, parallel spaced flanges having corresponding flared cutouts formed in adjacent ends thereof to define a flared recess in one end of said first member;
   a second member having a flared recess formed in an end thereof facing said recessed end of the first member;
   means mounting said members for relative displacement toward and away from each other whereby the recessed end of the second member will penetrate between the flanges of the first member and the recesses in both members will cooperate to define said variable space;
   the inner ends of said recesses being formed to define a relatively small confined space in the fully interpenetrated condition of said members wherein said material is constricted and compressed.

3. Apparatus as defined in claim 2, wherein said strip feeding means is supported in said second member to feed segments of strip across the inner end of said recess therein, and said strip manipulator means is supported between the flanges of said first member.

4. Apparatus as defined in claim 2, wherein said strip manipulator means comprises a support extending between the flanges of said first constrictor member and mounted for rotation about a longitudinal axis parallel to the direction of relative movement of said members; a pair of manipulator fingers interpivoted on said support so as to be movable to a spread-apart condition in a general plane parallel to the planes of said flanges and movable to a closed condition; means connected to said fingers and longitudinally displaceable a limited amount relative to said support for moving said fingers between their spread-apart and closed conditions; and means for rotating said support when the fingers have been moved to their closed condition.

5. Apparatus as defined in claim 2, wherein said first constrictor member is longitudinally displaceable towards and away from said first contrictor member; said strip manipulator means comprises a support extending between the flanges of said first member mounted for rotation about a longitudinal axis parallel to the direction of movement of said first member and mounted for bodily longitudinal displacement with said first member as well as for limited longitudinal displacement relative to said first member; said manipulator fingers are interpivoted on said support so as to be movable to a spread-apart condition in a general plane parallel to the planes of said flanges and movable to a closed condition; means connecting said fingers with said first member whereby said limited longitudinal displacement of the support relative to said first member will move the fingers between their spread-apart and closed conditions; and means for rotating said support when the fingers have been moved to their closed condition.

6. Apparatus as defined in claim 1, wherein said constrictor members are formed with flared recesses in facing ends thereof, and are arranged for interpenetration during relative movement thereof towards each other, the inner ends of said recesses being formed to define a relatively small confined space in the fully interpenetrated condition of said members wherein said material is constricted and compressed; and said strip feeding means is supported in one of said members to feed segments of strip across the inner end of said recess therein, and means are provided for intermittently operating said strip feeding means.

7. Apparatus as defined in claim 6, including cutter means supported in said one member and displaceable across the path of feed of the strip and means for intermittently operating said cutter means to cut off segments of strip.

8. Apparatus as defined in claim 6, wherein said strip includes magnetic material therein, and said one member has magnetic pole means mounted therein along the path of feed of the strip for holding the strip segments in position by magnetic attraction.

9. Apparatus as defined in claim 1, wherein said operating means comprise a camshaft, power means for rotating the camshaft, cams mounted on the camshaft and movement transmitting linkage including cam follower means engageable with said cams and connected for operating said constrictor displacing means, strip feeding means and finger closing and opening and rotating means in a cyclic sequence.

References Cited by the Examiner

UNITED STATES PATENTS

| | | | |
|---|---|---|---|
| 1,004,580 | 10/1911 | Lidback | 17—34 |
| 1,519,423 | 12/1924 | Theimer | 17—34 |
| 2,406,163 | 8/1946 | Prohaska | 17—34 |
| 2,524,316 | 10/1950 | Jackson | 100—10 X |

BILLY J. WILHITE, *Primary Examiner.*